J. A. KLINE.
LOCK BOLT.
APPLICATION FILED NOV. 20, 1916.

1,224,936.

Patented May 8, 1917.

Witnesses

J. A. Kline
Inventor by
Attorneys

UNITED STATES PATENT OFFICE.

JOHN A. KLINE, OF BLOOMSBURG, PENNSYLVANIA.

LOCK-BOLT.

1,224,936.
Specification of Letters Patent.
Patented May 8, 1917.

Application filed November 20, 1916. Serial No. 132,424.

*To all whom it may concern:*

Be it known that I, JOHN A. KLINE, a citizen of the United States, residing at Bloomsburg, in the county of Columbia and State of Pennsylvania, have invented a new and useful Lock-Bolt, of which the following is a specification.

The device forming the subject matter of this application is a bolt and collar structure, and the invention aims to provide novel means for holding collars on the bolt, there being no threaded connection between the collars and the bolt, and the collars being mounted to slide freely longitudinally of the bolt, saving when held by the mechanism forming the subject matter of this application.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1:
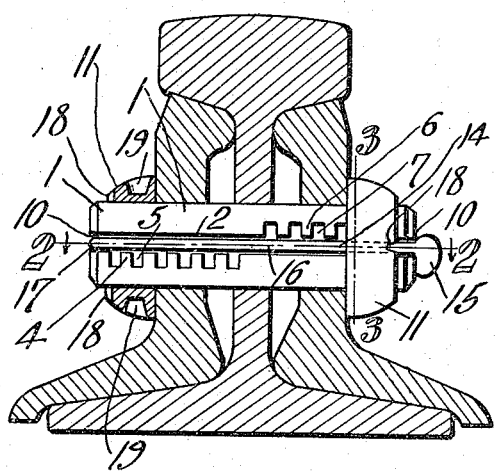
Figure 1 is a cross section showing the device applied to a railroad rail.
Figure 2:
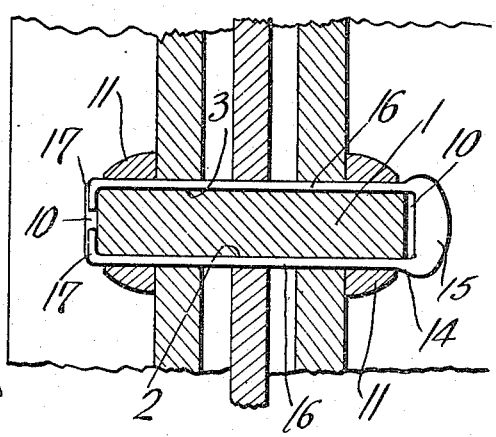
Fig. 2 is a cross section on the line 2—2 of Fig. 1.
Figure 3:
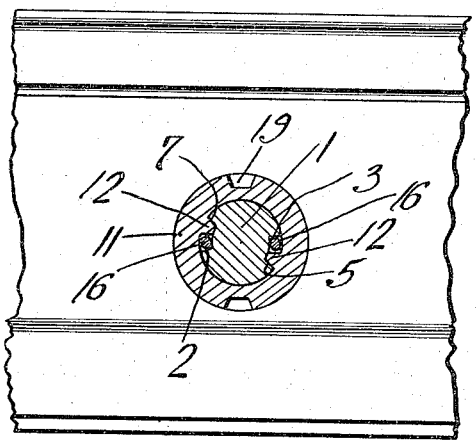
Fig. 3 is a section on the line 3—3 of Fig. 1.
Figure 4:
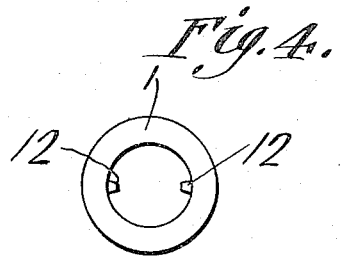
Fig. 4 is an end elevation of the collar.

In carrying out the present invention there is provided a bolt denoted by the numeral 1 and equipped in its opposite sides with longitudinal grooves 2 and 3. The bolt 1 is provided with teeth 4 defining recesses 5 opening into the groove 2, the teeth 4 being located adjacent one end of the bolt. The bolt 1 is provided adjacent its other end with teeth 6 defining recesses 7 opening into the groove 2. The teeth 4 and 6 project in opposite directions, circumferentially of the bolt. The bolt is provided with similar teeth coöperating with the groove 3. In its ends, the bolt 1 is provided with grooves 10. These ends communicate with the longitudinal grooves 2 and 3.

Mounted to slide for adjustment longitudinally of the bolt 1 are collars 11. The collars 11 are provided with internal teeth 12. When the collars 11 are moved longitudinally of the bolt 1, for adjustment, the teeth 12 of the collars lie in the grooves 2 and 3 of the bolt. When the collars 11 are rotated, the internal teeth 12 of the collars coact with the teeth on the bolt and enter the recesses defined by the said teeth. It will be obvious that when the teeth 12 of the collars 11 are lodged in the recesses, of which the recesses 5 and 7 may be taken as typical, the collars 11 cannot move endwise of the bolt 1.

In order to prevent a rotation of the collars 11, there is employed a U-shaped key 14 including a head 15 and arms 16. The arms 16 of the key 14 are inserted into the longitudinal grooves 2 and 3, behind the teeth 12 of the collars 11, and consequently, the collars cannot rotate, the teeth 12 of the collars being held engaged with the teeth of the bolt. Preferably, when the key 14 is seated, the head 15 of the key bears against one end of the bolt 1, the extremities of the arms 16 of the key being bent over as indicated at 17 to engage in one of the end grooves 10 of the bolt. Because the bolt is provided at each end with a groove 10, the bolt may be turned end for end.

The collars 11 may be provided with end notches 18 and with seats 19 in their circumference, the notches and the seats being adapted to coöperate with a suitable tool of any kind, whereby the collars may be manipulated. I am aware of the fact that no tool for manipulating a collar can be claimed in the same application with a device falling broadly under the head of a nut lock, and therefore, no tool has been shown in this application.

Having thus described the invention, what is claimed is:—

1. In a device of the class described, a bolt having a longitudinal groove and provided with a transverse recess opening into the groove; a collar movable longitudinally of the bolt and provided with an internal tooth movable in the longitudinal groove of the bolt when the collar is moved longitudinally of the bolt, the collar being rotatable to cause the tooth of the collar to enter the recess of the bolt; and a key insertible into the longitudinal groove of the bolt and engaging the tooth of the collar to hold the tooth in the recess and to prevent a movement of the collar circumferentially of the bolt and longitudinally of the bolt.

2. In a device of the class described, a bolt having longitudinal grooves in its opposite sides and provided with transverse recesses opening into the grooves; a collar movable longitudinally of the bolt and provided with internal teeth movable in the respective longitudinal grooves of the bolt when the collar is moved longitudinally of the bolt, the collar being rotatable to cause the teeth of the collar to enter the recesses of the bolt; and a U-shaped key insertible into the longitudinal grooves of the bolt and engaging the teeth of the collar to hold the teeth in the recesses and to prevent movement of the collar circumferentially of the bolt and longitudinally of the bolt.

3. In a device of the class described, a bolt having longitudinal grooves in its opposite sides, and provided in one end with a groove connecting the longitudinal grooves, the bolt being provided with transverse recesses opening into the respective grooves; a collar movable longitudinally of the bolt and provided with internal teeth movable in the respective longitudinal grooves of the bolt when the collar is moved longitudinally of the bolt, the collar being rotatable to cause the teeth of the collar to enter the respective recesses of the bolt; and a U-shaped key insertible into the longitudinal grooves of the bolt and engaging the teeth of the collar to hold the teeth in the recesses and to prevent a movement of the collar circumferentially of the bolt and longitudinally of the bolt, the ends of the key being engaged in the groove in the end of the bolt, to prevent a longitudinal movement of the key.

4. In a device of the class described, a bolt having longitudinal grooves in its opposite sides and provided with an end groove connecting the longitudinal grooves, the bolt being provided with transverse recesses opening into the longitudinal grooves; a pair of spaced collars movable longitudinally of the bolt and provided with internal teeth movable in the longitudinal grooves of the bolt when the collars are moved longitudinally of the bolt, the collars being rotatable to cause the teeth of the collars to enter the recesses of the bolt; and a U-shaped key insertible into the longitudinal grooves of the bolt and engaging the teeth of both collars to hold the teeth in the recesses and to prevent a movement of the collars circumferentially of the bolt and longitudinally of the bolt, the ends of the key being engaged in the end groove of the bolt.

In testimony that I claim the foregoing as my own, I have hereto affixed my signature in the presence of two witnesses.

JOHN A. KLINE.

Witnesses:
CHRISTIAN A. SMALL,
WILLIAM RUSH.

Copies of this patent may be obtained for five cents each, by addressing the "Commissioner of Patents, Washington, D. C."